(12) United States Patent
Stegall et al.

(10) Patent No.: US 6,352,137 B1
(45) Date of Patent: Mar. 5, 2002

(54) BRAKE MONITORING SYSTEM

(75) Inventors: Wally V. Stegall, Lancaster, SC (US); Alan C. Lesesky, Charlotte, NC (US)

(73) Assignee: Indian Head industries, Inc., Charlotte, NC (US)

( * ) Notice: Subject to any disclaimer, the term of this patent is extended or adjusted under 35 U.S.C. 154(b) by 0 days.

(21) Appl. No.: 09/532,542

(22) Filed: Mar. 22, 2000

(51) Int. Cl.$^7$ .............................................. F16D 66/00
(52) U.S. Cl. ........................... 188/1.11 L; 188/1.11 E; 340/454
(58) Field of Search ................ 188/1.11 L, 1.11 E, 188/1.11 W, 1.11 R; 303/113.4, 113.3; 340/452, 453, 454; 116/208

(56) References Cited

U.S. PATENT DOCUMENTS

| | | | |
|---|---|---|---|
| 2,448,981 A | 9/1948 | Ingres | |
| 2,467,517 A | 4/1949 | Almond | |
| 2,504,691 A | 4/1950 | Ingres | |
| 2,992,630 A | 7/1961 | Leighton et al. | |
| 3,020,094 A | 2/1962 | Murty et al. | |
| 3,101,133 A | 8/1963 | House et al. | |
| 3,101,219 A | 8/1963 | Herrera | |
| 3,107,583 A | 10/1963 | Woodward | |
| 3,112,959 A | 12/1963 | Kateley | |
| 3,117,496 A | 1/1964 | Dobrikin | |
| 3,131,609 A | 5/1964 | Dobrikin et al. | |
| 3,244,079 A | 4/1966 | Herrera | |
| 3,285,672 A | 11/1966 | Avrea | |
| 3,291,004 A | 12/1966 | Stevenson et al. | |
| 3,331,291 A | 7/1967 | Rumsey | |
| 3,380,349 A | 4/1968 | James | |
| 3,439,585 A | 4/1969 | Herrera | |
| 3,450,008 A | 6/1969 | Fites | |
| 3,502,003 A | 3/1970 | Dobrikin et al. | |
| 3,508,470 A | 4/1970 | Swander, Jr. et al. | |
| 3,515,438 A | 6/1970 | Stevenson et al. | |
| 3,548,720 A | 12/1970 | Swander, Jr. et al. | |
| 3,630,093 A | 12/1971 | Morse et al. | |
| 3,696,711 A | 10/1972 | Berg et al. | |
| 3,710,692 A | 1/1973 | Valentine | |
| 3,719,125 A | 3/1973 | Cannella | |
| 3,730,056 A | 5/1973 | Swander, Jr. | |
| 3,736,842 A | 6/1973 | Valentine | |
| 3,800,668 A | 4/1974 | Valentine | |
| 3,811,365 A | 5/1974 | Gordon et al. | |
| 3,908,520 A | 9/1975 | Ma | |
| 3,926,094 A | 12/1975 | Kurichh et al. | |

(List continued on next page.)

OTHER PUBLICATIONS

Automotive Handbook 4$^{th}$ Edition, published by Robert Bosch GmbH, 1996, p. 108.*

Primary Examiner—Robert J. Oberleitner
Assistant Examiner—Thomas J. Williams
(74) Attorney, Agent, or Firm—Howard & Howard

(57) ABSTRACT

A vehicle brake monitor for a brake actuator having a housing and a rod reciprocal through an opening in the housing. The brake monitor includes a magnet and a sensor located within the magnetic field of the magnet and fixed relative to the housing, and a shunt which is reciprocal with the brake actuator rod between the magnet and the sensor which interrupts a signal between the sensor and the magnet when the shunt is located between the magnet and the sensor during reciprocal movement of the rod, signaling at least one position of the rod relative to the housing. The disclosed embodiment of the brake monitor includes a sensor sleeve having two pairs of generally opposed magnets and sensors and a shunt sleeve surrounding the brake actuator rod having a pair of circumferentially spaced shunts which reciprocate with the brake actuator rod between each of the pairs of sensors and magnets, sensing and indicating several conditions of the brake actuator, including an overstroke condition, dragging brake, a failure of the brake monitoring system and normal operation.

25 Claims, 4 Drawing Sheets

U.S. PATENT DOCUMENTS

| | | | |
|---|---|---|---|
| 4,031,814 A | | 6/1977 | Lukens et al. |
| 4,043,251 A | | 8/1977 | Ohmi |
| 4,263,840 A | | 4/1981 | Herrera |
| 4,303,006 A | | 12/1981 | Burke et al. |
| 4,353,291 A | | 10/1982 | Hauduc |
| 4,382,762 A | * | 5/1983 | Schepp .................... 425/142 |
| 4,471,304 A | * | 9/1984 | Wolf ........................ 324/251 |
| 4,565,120 A | | 1/1986 | Gray et al. |
| 4,640,135 A | | 2/1987 | Kästel et al. |
| 4,664,016 A | | 5/1987 | Tobisawa et al. |
| 4,757,300 A | * | 7/1988 | Sebalos ................ 188/1.11 L |
| 4,850,263 A | | 7/1989 | Rumsey et al. |
| 4,855,712 A | * | 8/1989 | Wiley, Jr. et al. ........... 340/453 |
| 4,936,758 A | | 6/1990 | Coble |
| 4,945,818 A | | 8/1990 | Ware |
| 4,960,036 A | | 10/1990 | Gummer et al. |
| 5,002,164 A | | 3/1991 | Bowyer |
| 5,016,523 A | | 5/1991 | Bowyer |
| 5,067,391 A | | 11/1991 | Choinski et al. |
| 5,105,727 A | | 4/1992 | Bowyer |
| 5,134,254 A | * | 7/1992 | Musachio ..................... 191/6 |
| 5,193,432 A | | 3/1993 | Smith |
| 5,205,205 A | | 4/1993 | Choinski et al. |
| 5,263,403 A | | 11/1993 | Choinski et al. |
| 5,311,809 A | | 5/1994 | Choinski et al. |
| 5,315,918 A | | 5/1994 | Pierce |
| 5,320,026 A | | 6/1994 | Pierce |
| 5,345,858 A | | 9/1994 | Pierce |
| 5,353,688 A | | 10/1994 | Pierce et al. |
| 5,372,059 A | | 12/1994 | Pierce et al. |
| 5,377,579 A | | 1/1995 | Pierce |
| 5,433,138 A | | 7/1995 | Choinski et al. |
| 5,450,930 A | * | 9/1995 | Martens et al. ......... 188/1.11 L |
| 5,825,287 A | * | 10/1998 | Zarybnicky, Sr. et al. . 188/1.11 E |
| 6,255,941 B1 | * | 7/2001 | Osterman et al. ....... 188/1.11 E |

* cited by examiner

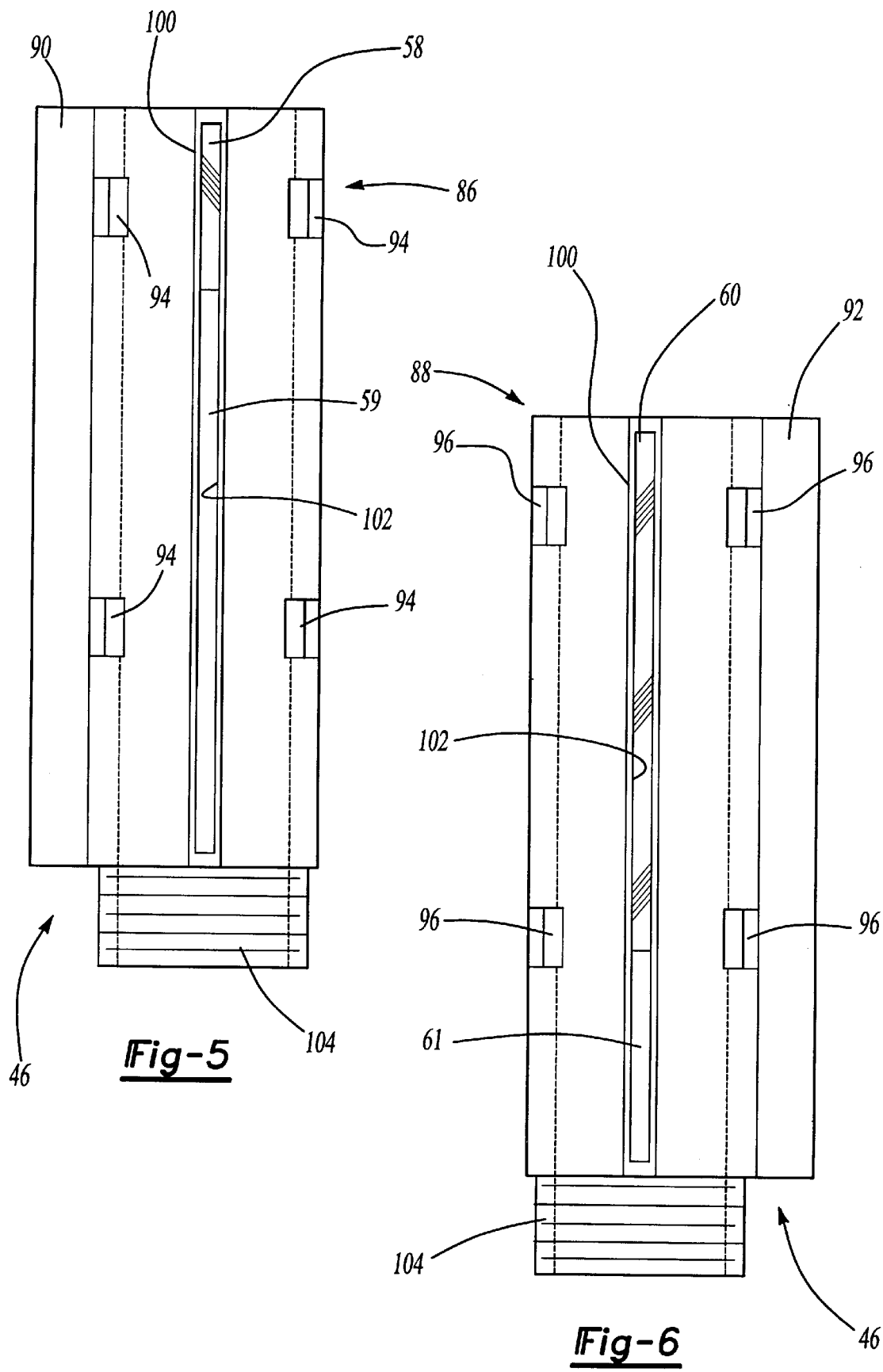

BRAKE MONITORING SYSTEM

FIELD OF THE INVENTION

The present invention relates to an improved brake monitoring system particularly for use on heavy vehicles, such as a tractor and trailer combination, buses and the like, having a plurality of spring brake actuators.

BACKGROUND OF THE INVENTION

Heavy-duty trucks, buses and other large vehicles are typically equipped with a pneumatic brake actuating system. The brake actuating system typically applies air under pressure to a service chamber of a brake actuator to move a diaphragm in a first direction. A push rod moves with the diaphragm and the push rod is connected to a linkage which actuates the vehicle brakes. In a piston-type brake actuator, the piston plate seals against the internal surface of the housing, eliminating the requirement for a diaphragm. An emergency chamber having a power spring and a second diaphragm is typically mounted on the service chamber and is operable to move the push rod and actuate the brakes in the event that the pneumatic vehicle system fails or when the vehicle is turned off when the vehicle is parked. Thus, the emergency chamber serves as an emergency braking system for the vehicle and a parking brake.

A brake actuator has a predetermined amount of available movement or stroke of the push rod. The amount of movement of the push rod required to fully actuate the braking system of the vehicle should be carefully monitored, such that it is within the available stroke of the push rod of the brake actuator. Excessive movement of the push rod can be created by one of several factors. Typically, excessive movement of the push rod is due to brake lining wear. As the brakes wear, more movement of the push rod is required to actuate the brakes. Further, if the linkages and connections between the push rod and the linkages, et cetera, bend or become loose or excessively worn, additional push rod movement may be required to actuate the brakes. A combination of these several factors may sometimes cause the amount of push rod movement required to actuate the brakes approach the available push rod movement or stroke available from the brake actuator. As will be understood, this is an undesirable situation.

The prior art has proposed various methods and apparatus to monitor the push rod movement during actuation of the brake and provide some indication to an operator as to when there is excessive push rod movement, which is referred to as "overstroke." As will be understood, a determination of when there is excessive push rod movement or overstroke is dependent upon the designed or rated stroke of the brake actuator. For example, the push rod of a typical brake actuator may include a brightly colored ring, which may be painted on the push rod, indicating an overstroke condition when the ring extends out of the brake actuator during actuation of the brakes. The ring may, however, be difficult to see because of the location of the brake actuators beneath the truck or trailer and accumulated road debris. Automatic slack adjusters located between the push rod and the foundation brake are also conventionally used, wherein the slack adjuster incrementally adjusts to compensate for slack in the braking system and to decrease the required push rod movement.

The prior art has also proposed various electronic monitoring systems which generally monitor either the stroke of the push rod or the movement of the linkages between the push rod and the foundation brake including the slack adjuster. However, there are several obstacles to be overcome. First, powering and monitoring electronic indicators on each brake actuator of an 18-wheel vehicle is costly. Further, the hostile environment in which the brake actuators are mounted beneath the vehicle can damage the monitoring system, particularly where there are exposed pistons, sleeves, sensors, et cetera. Finally, where the stroke of the push rod is monitored by the brake monitoring system, it is essential that the push rod stroke monitoring system be accurately assembled on the brake actuator and be able to withstand the hostile environment of the brake actuator. Finally, it is desirable that the components of the brake monitoring system be easily and accurately assembled on the brake actuator preferably without special tools.

SUMMARY OF THE INVENTION

The present invention relates to an improved brake monitoring system which may include a plurality of brake monitors mounted on each of the plurality of brake actuators of a vehicle. As set forth above, a conventional brake actuator includes a housing having an opening therethrough, a reciprocal piston rod or push rod extending through the housing opening and typically an annular stone shield mounted within the housing opening surrounding the push rod preventing debris from entering the brake actuator housing.

As set forth above, the improved vehicle brake monitor of this invention may be utilized with any brake actuator which includes a housing and a piston or push rod reciprocable through an opening in the housing for actuation of a vehicle brake. A typical brake actuator includes a flexible cup-shaped diaphragm having a peripheral edge portion which is supported within the housing and a piston having a piston plate which is spring biased against the diaphragm by a return spring. The piston rod or push rod is reciprocable through an opening in the housing having a free end typically connected to a slack adjuster, which is connected to the foundation brake of the vehicle. Upon actuation of the brake by the vehicle operator, the pneumatic pressure of the vehicle is received by the brake actuator, inverting the flexible diaphragm and driving the piston rod through the opening in the brake actuator housing, actuating the braking system of the vehicle. As will be understood, however, the improved brake monitor of this invention may be utilized with any brake actuator, including piston-type brake actuators, wherein the piston plate or head is sealed against an inside surface of the brake actuator housing, eliminating the requirement for a cup-shaped diaphragm, and other types of brake actuators. The brake actuator may also include an emergency chamber having a power spring as is well known in the prior art.

The improved brake actuator of this invention includes a sensor, such as a reed switch, and a generally opposed spaced magnet, which are fixed relative to the housing of the brake actuator. As will be understood from the following description of the improved vehicle brake monitor of this invention, the sensor is located relative to the magnet such that the sensor is within the magnetic field of the magnet, but is spaced from the magnet. Thus, the term "opposed" is not intended to limit the relative location of the magnet and sensor except as required for this application. For example, where the sensor is a reed switch, the normally open reed switch sensor is closed within the magnetic field of the magnet. The vehicle brake monitor further includes a shunt having a predetermined length which is reciprocal with the brake actuator rod between the magnet and the sensor. The shunt, for example, may be a ferrous metal or ferrous alloy strip which projects radially from the rod and reciprocates with the rod between the sensor and the magnet, interrupting the signal between the sensor and the magnet when the shunt is located between the sensor and the magnet during reciprocal movement of the rod signaling at least one position of the rod relative to the housing. Although in the preferred embodiment of the vehicle brake monitor, the shunt is located in a sleeve fixed to the rod and the opposed sensor and magnet are located in a sensor sleeve surrounding the rod, the entire assembly of sensor, magnet and shunt may be separate from the rod, provided the sensor and magnet are fixed relative to the housing and the shunt reciprocates with the rod. The vehicle brake monitor of this invention may thus be utilized to indicate at least one condition of the brake actuator, such as an overstroke condition, wherein the brake actuator is nearing or exceeds an overstroke condition, or a dragging brake, wherein the brake actuator rod does not return to a "zero stroke" condition following actuation of the brakes.

In the most preferred embodiment of the brake actuator of this invention, the brake monitor includes two pairs of generally opposed space magnets and sensors, which are fixed relative to the housing, and two shunts, each having a predetermined length or position relative to the longitudinal axis of the rod, which reciprocate with the push rod between each of the opposed pairs of sensors and magnets. By utilizing two pairs of magnets, sensors and shunts, several conditions of the brake actuator may be identified and monitored, including a dragging brake, an overstroke condition, normal operation and a failure of the vehicle brake monitor for each brake actuator on the vehicle. As described more fully in application Ser. No. 09/091,057, filed Nov. 30, 1998, assigned to the assignee of this application, each brake monitor may include an RF transmitter which periodically transmits the condition of each brake actuator to a controller. Alternatively, the brake actuator monitor may be hardwired to the controller. The controller then signals the condition of each brake actuator to the vehicle operator by conventional display, such as a heads up display in the vehicle cab or a conventional display panel.

In the preferred embodiment of the vehicle brake monitor of this invention, the magnet and sensor are located in a sensor sleeve generally surrounding the brake actuator rod. In the most preferred embodiment, the sensor sleeve is a stone shield located within the brake actuator housing opening surrounding the rod of the brake actuator. In this preferred embodiment of the vehicle brake monitor of this invention, the shunt is located in a sleeve fixed to the brake actuator rod, wherein the shunt extends radially between the magnet and sensor during reciprocal movement of the sleeve on the rod. In the most preferred embodiment, the shunt sleeve on the rod of the brake actuator includes two circumferentially spaced radially extending shunts which reciprocate with the push rod between each of the pairs of sensors and magnets. Because the shunts are of different lengths and/or spaced along the longitudinal axis of the rod, the brake monitor can detect multiple positions of the rod relative to the brake actuator as described above. The most preferred embodiment of the shunt sleeve further includes a key or radially projecting rib and the sensor sleeve includes a radial slot or keyway which slideably receives the key on the shunt sleeve positioning the shunt sleeve relative to the sensor sleeve during reciprocal movement of the shunt sleeve and the brake actuator rod.

The vehicle brake monitoring system of this invention is thus relatively simple in design, rugged in construction and able to withstand the harsh environment required of brake actuators. Further, the brake actuator monitor of this invention may be utilized to monitor various conditions of the brake actuator including a dragging brake, overstroke, normal operation and a malfunctioning brake actuator monitor, particularly where the sensor is a reed switch as described above. Other advantages and meritorious features of the vehicle brake monitor of this invention will be more fully understood from the following description of the preferred embodiments, the appended claims and the drawings, a brief description of which follows.

BRIEF DESCRIPTION OF THE DRAWINGS

FIGS. 5 and 6 are side elevations of the shunt sleeve shown in FIGS. 1 and 2 illustrating a preferred position of the shunts in the shunt sleeve.

DETAILED DESCRIPTION OF THE PREFERRED EMBODIMENTS

Figure 1:
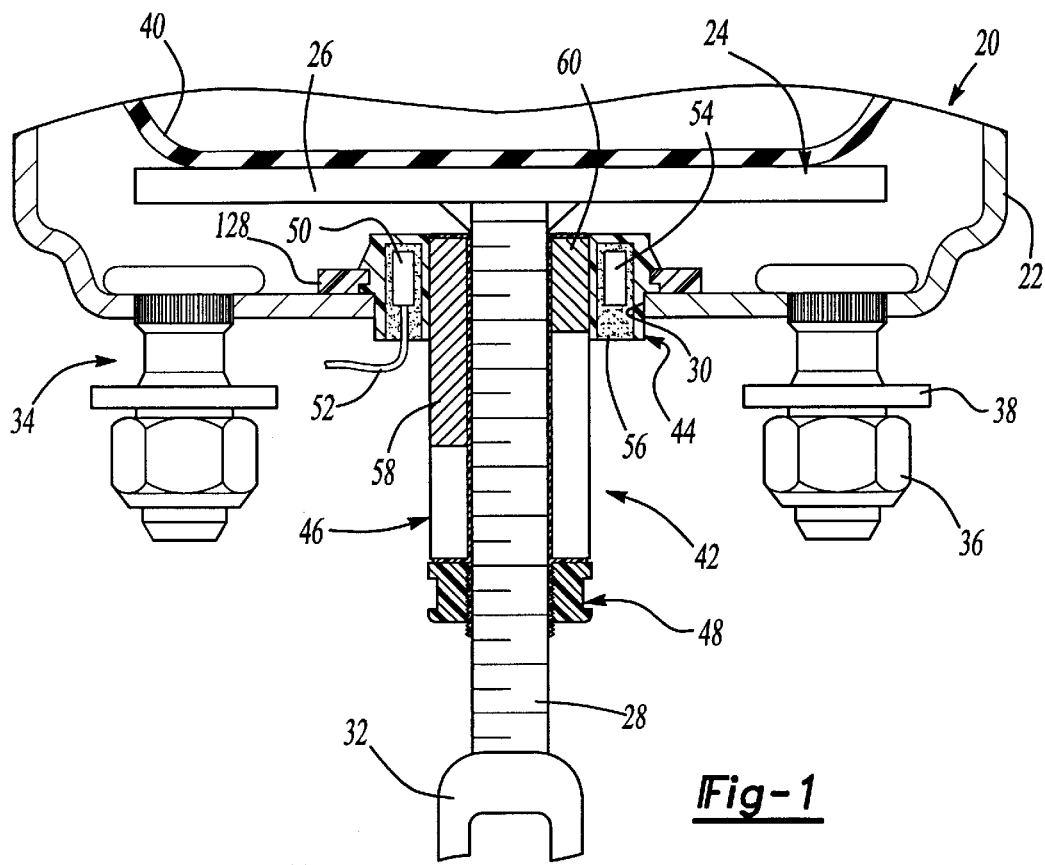
FIG. 1 is a partial side partially cross-sectioned view of a preferred embodiment of a vehicle brake monitor of this invention.

As set forth above, the vehicle brake monitor of this invention is particularly useful for monitoring the brakes of large or heavy vehicles having a plurality of brake actuators, such as the brake actuator 20 illustrated in FIG. 1. The brake actuator 20 illustrated in FIG. 1 includes a housing 22 having a reciprocable piston 24. The piston 24 includes a piston head or plate 26, a piston rod or push rod 28 which is reciprocable through an opening 30 in the housing for actuation of the vehicle braking system. The rod 28 is conventionally threadably attached to a clevis 32 and the clevis 32 is conventionally attached to the slack adjuster of the vehicle braking system (not shown). The brake actuator housing 22 is conventionally attached to a bracket (not shown) on the undercarriage of the vehicle, cab or tractor adjacent the vehicle axles by a plurality of mounting bolts 34 which threadably receive nuts 36 and washers 38. Upon actuation of the vehicle brake by the operator, the piston 24 is driven by air pressure from the pneumatic braking system of the vehicle to drive the push rod 28 through housing opening 30 to actuate the braking system of the vehicle. A conventional brake actuator of the type illustrated includes a flexible diaphragm 40 and the pressurized air received in the brake actuator housing 22 inverts and drives the flexible diaphragm 40 against the piston plate 26, driving the rod 28 through the opening 30 in the housing to actuate the braking system of the vehicle. Upon deactivation of the brake, such as release of the brake pedal, the pressure in the housing 22 returns to zero and the piston 24 is moved upwardly in FIG. 1 by a return spring (not shown) which reacts against the piston plate 26. The above description of the brake actuator 20 is conventional. As will be understood by those skilled in this art, the brake monitor of this invention may be utilized with any brake actuator, including, for example, piston-type brake actuators wherein the piston plate is sealed against the internal surface of the housing 22, eliminating the requirement for a diaphragm 40.

The brake monitoring system of this invention is specifically adapted to monitor the position of the push rod 28 as it reciprocates through the opening 30 in the housing 22. More specifically, the brake monitoring system of this invention is adapted to monitor several conditions of the brake actuator, including an overstroke condition, wherein the push rod 28 extends beyond the intended or rated limit of the piston stroke, indicating, for example, a worn brake, a dragging brake condition, wherein the push rod does not return to the ready or zero position, a nonfunctioning brake monitor and a normal stroke condition. It should also be understood that the brake monitor must be able to withstand the extreme conditions encountered by brake actuators located under a vehicle or trailer, including extreme temperature variations and road debris including water, salt and ice.

The illustrated preferred embodiment of the brake monitor 42 includes a sensor sleeve 44, which is fixed relative to the housing 22 and a shunt sleeve 46, which is fixed relative to the rod 28 by lock ring 48 during reciprocal movement of the piston rod 28 as described above. The sensor sleeve includes a sensor 50 connected by wire 52 to a monitor (not shown) and a magnet 54, such that the sensor 50 is located within the magnetic field of the magnet 54. The sensor 50 and magnet 54 may be potted in chambers or recesses defined in the sensor sleeve 44 by potting material 56 as described below. The shunt sleeve 46 includes magnetic shunts 58 and 60 which are received between the sensor 50 and magnet 54 interrupting a signal between the sensor and the magnet when a shunt is located between the sensor and the magnet during reciprocal movement of the push rod 28, thereby signaling at least one position of the rod 28 relative to the housing 22 as described below.

Figure 2:
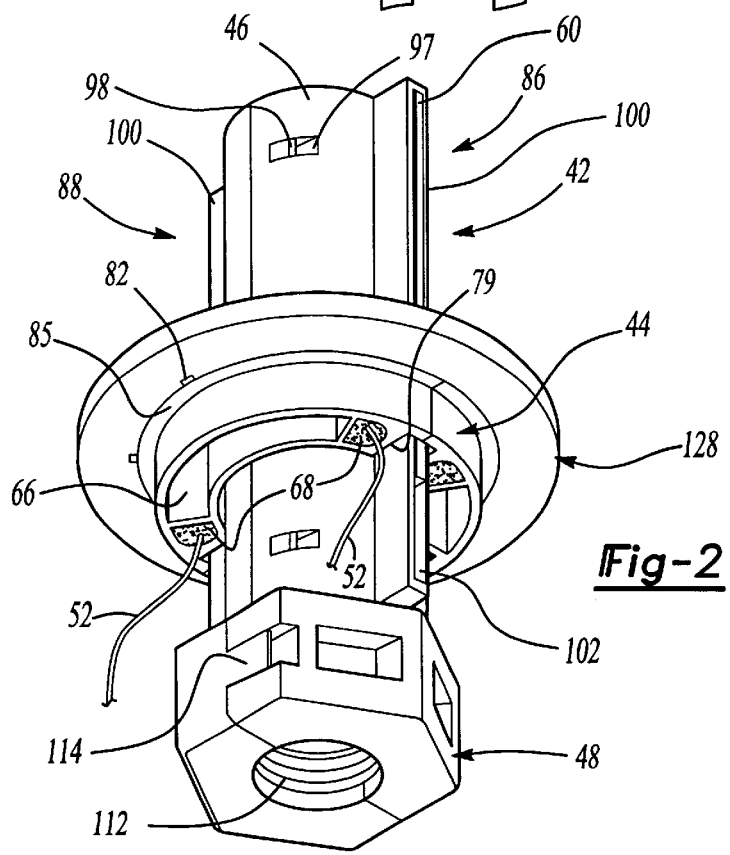
FIG. 2 is a side elevation of the embodiment of the brake monitor shown in FIG. 1 without the brake actuator.
Figure 3:
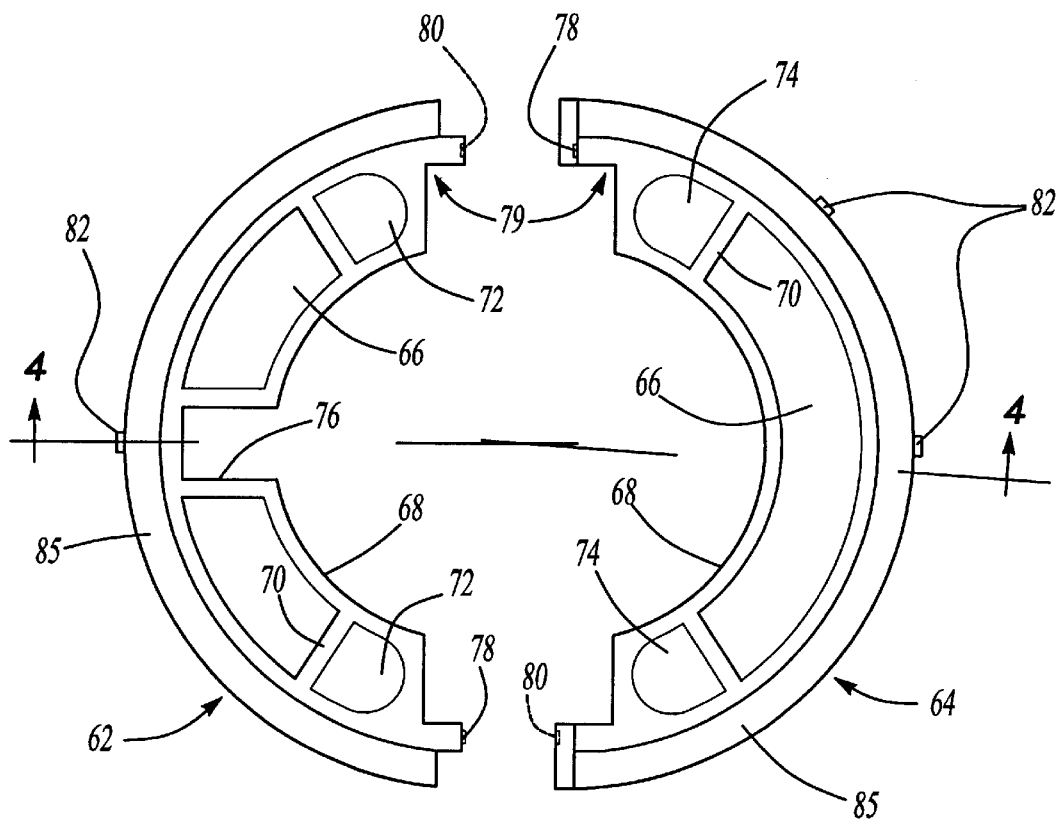
FIG. 3 is a bottom view of the embodiment of the sensor sleeve shown in FIGS. 1 and 2 prior to assembly.
Figure 4:
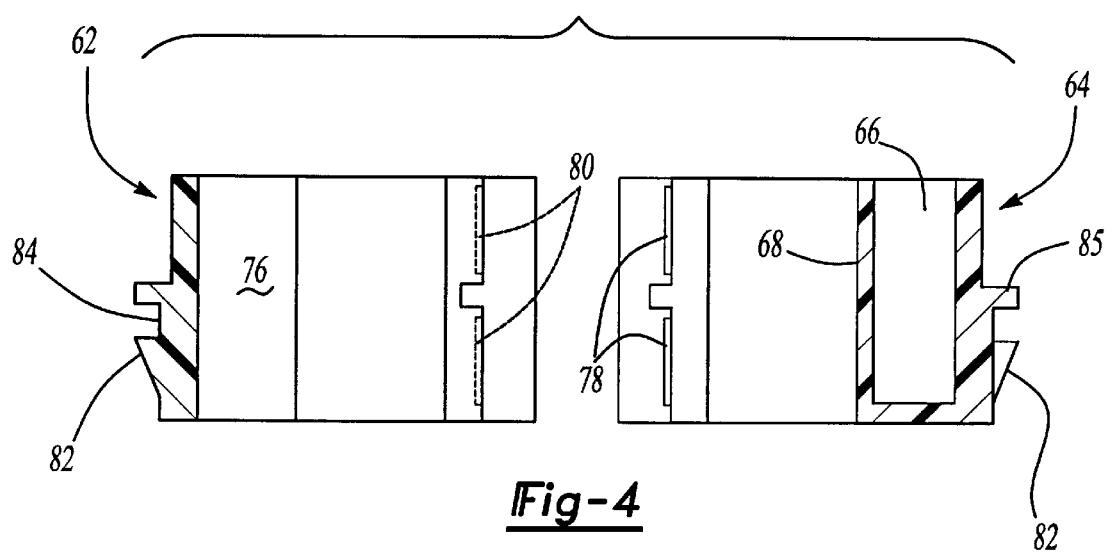
FIG. 4 is a side cross-sectional view of the brake monitor shown in FIG. 4 in the direction of view arrows 4–4.

A preferred embodiment of the sensor sleeve 44 will now be described with reference to FIGS. 1 to 4 and 7. As best shown in FIGS. 3 and 4, the sensor sleeve 44 is comprised of two generally semi-circular parts 62 and 64 each having a semi-circular recess 66 defined by the semicircular rim portion 68. As will be understood, one of the generally semi-circular parts or components 62 and 64 may be slightly greater than one half of a circle or semi-circle, such that the larger component snaps on the push rod 28 or the components may be semicircular as shown. The semi-circular recess 66 further includes radial integral web portions 70 which define two sensor pockets 72 each of which receive a sensor 50 as shown in FIG. 1 and described above and two magnet pockets 74 each of which receive a magnet 54. As will be understood, each sleeve component 62 and 64 may have one sensor 50 and one magnet 54, provided the sensors and magnets are generally opposed in the assembled sensor sleeve 44. One of the generally semi-circular parts 62 further includes a radial keyway 76 which receives the radial projecting end portions 90 and 92 of the shunt sleeve 46 as described below. The generally semi-circular part 62 further includes opposed alignment tabs 78 which are received in slots 80 in the other part 64 when the generally semi-circular parts are assembled. Further, the generally semi-circular parts 62 and 64 include frustoconical tabs 82 which receive the support ring 128 shown in FIGS. 1 and 2 described below. The frustoconical tabs 82 define a groove 84 bordered by annular radial rib 85. Upon assembly, the eight angled portions define an inwardly opening slots 79 which receive the radial shunt holders 100 on the shunt sleeve 46 as described below.

The illustrated embodiment of the shunt sleeve 46 is best described with reference to FIG. 7. As shown, the illustrated embodiment of the shunt sleeve includes two generally semi-circular parts 86 and 88. Each part includes a radially projecting end portion or flange 90 and 92. The radially projecting flange 90 and the opposed end portion 91 includes slots 94 which receive locking tabs 96 on the other part 88 having a hook-shaped or inclined barb 98. Upon assembly, the tabs 96 are received through slots 94 and locked in place by the hooked or barbed end portion 98. The shunt sleeve 46 further includes longitudinally extending radial shunt holders 100 each having a longitudinally extending radial slot 102 which receive the shunts 58 and 60 shown in FIGS. 1, 5 and 6 and described below. The internal surface 106 of the shunt sleeve components 86 and 88 is generally cylindrical to receive the cylindrical push rod 28 as shown in FIG. 1.

Figure 7:
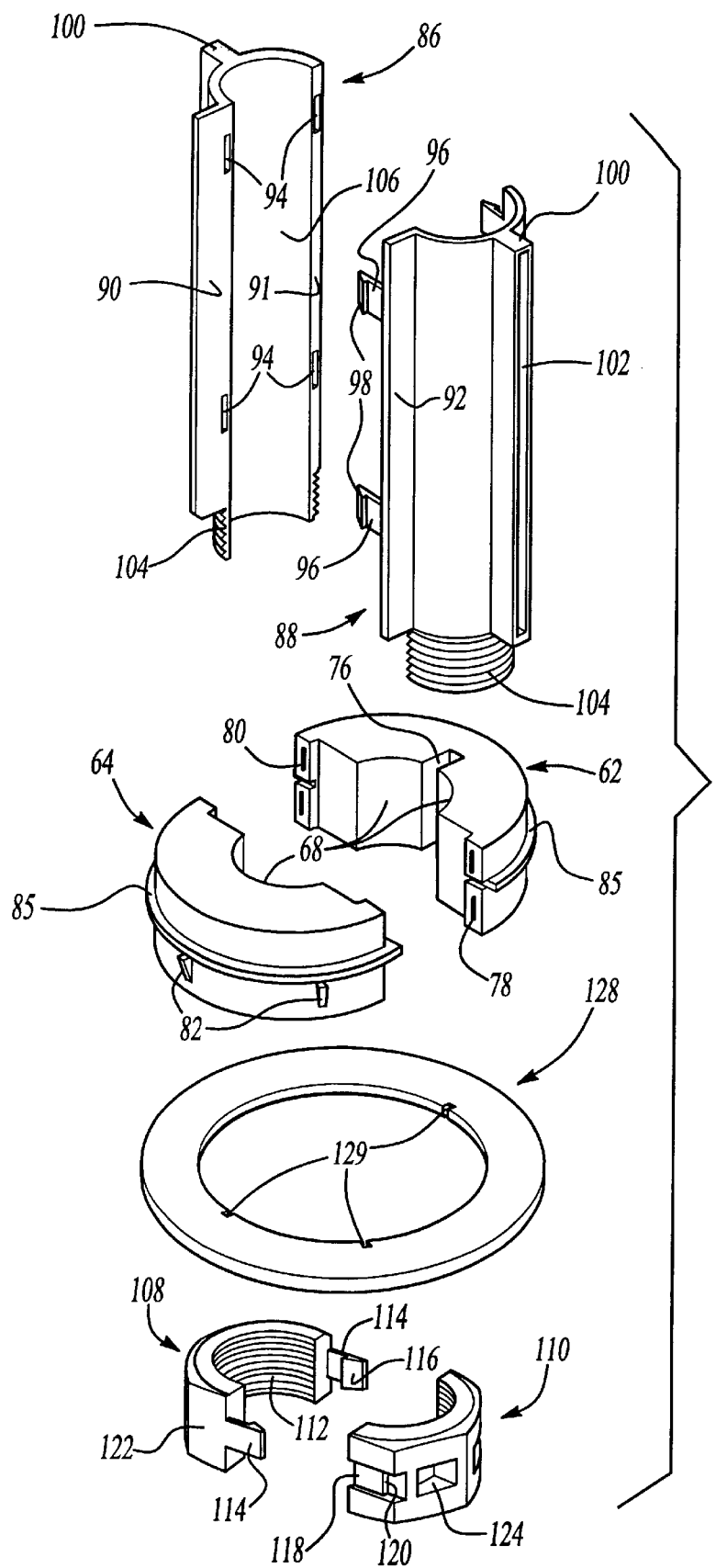
FIG. 7 is an exploded side elevation of the components of the embodiment of the brake monitor illustrated in FIGS. 1 and 2.

The lock ring 48 shown in FIGS. 1 and 7 also includes generally semicircular parts 108 and 110. The internal surface 112 is threaded to threadably receive the external threaded end portion 104 of the shunt sleeve as described below. One of the generally semicircular parts 108 of the lock ring includes opposed locking tabs 114 having a wedge-shaped end portion 116 which are received in slots 118 on the generally semi-circular part 110 and locked in place against transverse surface 120. The disclosed embodiment of the lock ring 48 has a polygonal exterior surface 122 and further includes gripping surfaces 124 for use during assembly of the lock ring on the shunt sleeve 46 as described below.

Having described preferred embodiments of the components of the brake monitor 42 of this invention, the assembly of the components on the brake actuator 20 may now be described. First, the sensor sleeve 44 is assembled by inserting the tabs 78 into the slots 80. Next, the support ring 128 is snapped over the frustoconical tabs 82 into the slot 84 shown in FIG. 4. The supporting 128 includes radial notches 129 which receive the inclined tabs 82. The assembly is then inserted into the opening 30 in the brake actuator housing 20 as shown in FIG. 1. The shunt sleeve 46 is assembled on the brake actuator rod 28, prior to threaded attachment of the device 32 on the brake actuator rod 28 and the piston 24 is then received in the brake actuator housing 22. As described above, the components of the shunt sleeve 46 are assembled by snapping the locking tabs 96 into the slots 94 around the brake actuator rod 28. The radial key on the shunt sleeve formed by radial flanges 90 and 92 is slidably received in the radial keyway 76 in the sensor sleeve 44, accurately aligning the radial shunt holders 100 in the inwardly opening slots 79 formed upon assembly of the sensor sleeve 44 and the support ring 128, as best shown in FIG. 2. The shunt sleeve 46 is then accurately positioned on the push rod 28 by lock ring 48. First, the shunt sleeve 46 is accurately positioned on the push rod 28 by measuring the distance between the piston plate 26 and the predetermined position of the shunt sleeve, such that the shunts 58 and 60 are accurately located relative to the sensors 50 and the opposed magnets 54 in the sensor sleeve 44. The lock ring 48 is then assembled on the threaded portion 104 on the end of the shunt sleeve by receiving the locking tabs 114 into the slots 118 where the wedge-shaped end portions 116 are received behind the transverse surface 120 as shown in FIG. 7. The internal thread 112 on the lock ring 48 then mates with the threads 104 on the end of the shunt sleeve and the lock ring is then tightened by threading the lock ring on the shunt sleeve, fixing the position of the shunt sleeve 46 on the push rod 28 as shown in FIG. 1.

The positioning of the shunts 58 and 60 in the longitudinal slots 102 in the radial shunt holders 100 of the shunt sleeve will depend upon the conditions of the brake actuator 20 to be measured. As will be understood from the following description of the operation of the brake monitor 42 of this invention, the shunts 58 and 60 may be of different lengths and/or different longitudinal positions along the longitudinal axis of the shunt sleeve 46 and push rod 28.

Having described the assembly of one embodiment of the brake monitor 42 of this invention, the operation of the brake monitor may now be described. As set forth above, a conventional brake actuator includes a piston 24 having a rod 28 which reciprocates through an opening 30 in the brake actuator housing 22 to actuate the braking system of a vehicle (not shown). A brake actuator of this type has a predetermined amount of available movement or stroke of the push rod 28. Therefore, the reciprocal movement of the push rod required to fully actuate the braking system of the vehicle should be carefully monitored, such that it is within the available stroke of the push rod 28. Typically, excessive movement of the push rod is due to brake lining wear; however, excessive stroke may also be caused by wear or damage to the linkages between the push rod and the foundation brake. When the reciprocal movement of the push rod 28 through the opening 30 in the housing exceeds the rated limit of the brake actuator, this is referred to as an "overstroke" condition. Thus, it would be desirable to monitor the reciprocal movement of the brake actuator to signal an overstroke condition. Another condition which should be monitored is a dragging brake, wherein the brake actuator rod 28 does not return to a zero stroke condition within the housing following release of the brakes. A dragging brake condition may, for example, occur when the emergency brake is released during start-up of the vehicle and the piston 24 does not retract into the brake actuator housing to the ready or zero stroke position. As described above, when the pneumatic pressure acting against the flexible diaphragm 40 is returned to zero, a return spring (not shown) normally reacts against the piston plate 26 to retract the piston rod 28 into the housing. However, where the vehicle foundation brake fails to release either during start-up or during operation of the braking system, this is a dragging brake condition. It would also be desirable to monitor the components of the brake monitor to signal a failure. The disclosed embodiment of the brake monitor of this invention will monitor each of these conditions as now described.

As will now be understood, the preferred embodiment of the brake monitoring system of this invention includes two pair of magnets 54 located in the magnet pockets 74 of the sensor sleeve 44 and two sensors 50 located in the sensor pocket 72 within the magnetic field of the magnets. In one preferred embodiment, the sensors 50 are normally open reed switches commercially available from various sources. However, when this type of sensor is located within the magnetic field of the magnet 54, the reed switch is closed. A signal that the reed switch has closed may be transmitted to a control module by wire 52. Alternatively, an RF transmitter (not shown) may be embedded in the sensor sleeve adjacent each of the reed switches which transmits a signal to a conventional receiver indicating that the reed switch has closed or is open. The RF transmitter may be a single chip RF transmitter including a battery having a useful life longer than that of the brake actuator. However, to extend the battery life, the RF transmitter may enter a "sleep" mode until an event occurs at which time it would transmit a signal. Alternatively, the RF transmitter may be a passive RF transmitter as is known in the art which receives energy via a transmitted RF signal from a controller or other source as disclosed in the above-referenced copending patent application.

Upon actuation of the brake actuator by the vehicle pneumatic braking system, as described above, the piston 24 moves downwardly in FIG. 1, extending the push rod 28 through the opening 30 in the housing. The shunts 58 and 60 are then received between the generally opposed sensors 50 and magnets 54 interrupting or blocking a signal between the sensor and the magnet. In the described embodiment, wherein the sensor is a normally open reed switch, the switch is closed when located within the magnetic field of the adjacent magnet and open when a shunt is received between the adjacent magnet and sensor, blocking the magnetic field. Thus, in the disclosed embodiment, the shunts may be formed of any ferrous material, such as a strip of iron, steel or iron alloy, which blocks the magnetic field of the magnets 54. Stated another way, the shunts interrupt a signal between the sensor and the magnet when the shunt is located between the sensor and the magnet. Thus, the length and longitudinal position of the shunts on the shunt sleeve 46 will determine the condition of the brake actuator monitored.

FIG. 1 actually illustrates an overstroke condition of the brake actuator, wherein the shunt 60 is located between a sensor and a magnet. When the piston 24 is fully retracted into the housing 22 of the brake actuator, the shunt 60 is located above the adjacent sensor and magnet and the sensor is therefore closed because it is located within the magnetic field of the adjacent magnet. The fully retracted position of the piston is referred to in the art as the "zero stroke" position. When the brakes are applied, the piston begins to move downwardly in FIG. 1 and the piston rod 28 extends through the opening 30 in the brake actuator housing 20 to actuate the braking system of the vehicle as described above. The shunt sleeve 46 then moves through the sensor sleeve 20 and during normal operation of the brake actuator, the shunt 60 is not received between the adjacent magnet 54 and sensor 50 because there is a space 61 between the end 104 and the shunt 60 as best shown in FIG. 6. That is, the sensor 50 is within the magnetic field of the magnet 54 and the reed switch remains closed. However, when the piston 28 and the shunt 60 of the shunt sleeve 46 is received between the adjacent sensor 50 and magnet 54 as shown in FIG. 1, the sensor 50 closes because the shunt 60 interrupts the magnetic field. This is an "overstroke" condition for the brake actuator and a signal is then sent to the controller through line 52, indicating an overstroke condition. As will be understood from the above description, it is necessary for the controller to know when the brakes are applied to determine whether there is an overstroke condition and therefore the control circuit is preferably wired to the brake light. That is, an overstroke condition is when the brake is applied and the piston rod 28 extends beyond a rated condition for the brake actuator 20. Therefore, the disclosed embodiment of the brake monitor 42 will signal an overstroke condition.

A dragging brake is indicated by shunt 58 and the associated sensor and magnet. At the zero stroke position, the shunt 58 is located above the adjacent sensor 50 and magnet 54 and therefore the sensor is located within the magnetic field of the magnet and the reed switch is closed. During the initial movement of the piston rod 28, the shunt holder 100 has an open space 59 as shown in FIG. 5. Thus, the reed switch remains closed. However, when the shunt 58 is received between the associated sensor and magnet 54 and the brake is not actuated, this indicates a dragging brake condition. That is, when the brake is not on, but the piston 24 has not returned to zero stroke, the brake monitor 42 will indicate a dragging brake condition. Thus, the monitor must also know when the brake is actuated to indicate a dragging brake condition and the sensor 50 associated with the shunt 58 may also be wired into the brake light of the vehicle.

Finally, the disclosed embodiment of the brake monitor 42 will also sense and indicate a failure of the brake monitor. For example, if a wire breaks or a sensor is not operating, the circuit will sense an open sensor condition, indicating a failure.

The brake monitor of this invention may thus be utilized to sense and indicate an overstroke condition of the brake actuator 20, wherein the piston rod 28 extends beyond the rated stroke for the brake actuator. Further, the brake monitor will also indicate a dragging brake condition as described above. Finally, the brake monitor will indicate a failure in the system or a normal operating condition. Thus, the brake monitor of this invention will actually sense and indicate five functions of each of the brake actuators, including an overstroke condition, a dragging brake, a non-functioning brake actuator, normal stroke and sensor fault. These conditions may, for example, be easily monitored by the vehicle operator by flashing lights at the front of the trailer, opposite the back window the tractor truck, such as green for normal stroke operation, red for overstroke, flashing red for dragging brake, etc. Alternatively, the sensors may be connected to a heads up display in the cab or a monitor in the cab. As set forth above, the sensors 50 may be hardwired to a controller by wires 52 or the wires may be eliminated by use of passive RF transmitters, as described above, which may be potted in the recess 66 in the sensor sleeve 44.

The components of the brake monitor 44 may be formed of various materials. However, the sensor sleeve 44, shunt sleeve 46, lock ring 48 and the support ring 128 for the sensor sleeve are preferably formed of a polymer or plastic able to withstand the hostile environment of a brake actuator, as described above. A suitable plastic is Nylon 6 which is available, for example, from BASF Corporation under the trade name "Ultramid B3ZG3," which is a high impact glass filled Nylon. As set forth above, the sensors in the preferred embodiment are reed switches, such as reed switches available from Oki Electric Industry Co. Ltd. of Tokyo, Japan. However, various sensors may be utilized including, for example, Hall-effect sensors. The magnets 54 may be any conventional magnetic material; however, a Neodynium 35 magnet has been found suitable for this application. The shunt material may be any suitable ferrous material which will interrupt the magnet field, such as a nickel iron alloy, preferably having high permeability. A suitable material is "Hymu80" available from National Electronic Alloys of Oakland, N.J.

Having described a preferred embodiment of the brake monitor of this invention, it will be understood by those skilled in this art that various modifications may be made to the disclosed embodiment within the purview of the appended claims. For example, it may be preferred to close the free end of the radial shunt holders 100 and insert the shunts 58 and 60 through longitudinal slots in the inside surface 106 of the shunt sleeve 46 shown in FIG. 7. This would protect the shunts from the environment of the brake actuator. Various lock ring designs may also be utilized which fix the shunt sleeve 46 relative to the piston rod 28. In the preferred embodiment of the brake monitor 42, however, the components may be assembled without special tools and the components are designed to avoid improper assembly of the components as described. Further, as described above, the shunts 58 and 60 may be of different lengths and configurations to sense and indicate various positions of the push rod 28 as it reciprocates through the opening 30 in the housing 22 of the brake actuator 20. Further, the number of sensors, magnets and shunts will depend upon the brake actuator conditions to be monitored. For example, it would be possible to use only one shunt and pair of generally opposed magnets and sensors to sense and indicate one condition of the brake actuator. Alternatively, it would also be possible to utilize more than two shunts and two pairs of sensors and magnets to sense and indicate multiple positions of the brake actuator piston rod 28. More than one shunt may also be included in each longitudinal slot 102 in the radial shunt holders 100. Finally, in the preferred embodiment of the brake actuator, the sensor sleeve 44 is mounted in the opening 30 in the brake actuator housing as shown in FIG. 1, such that the sensor sleeve 44 also serves as a stone shield, preventing entry of road debris into the brake actuator housing 22. As described above, the sensor sleeve 50 is preferably assembled in the housing opening 30 during assembly of the brake actuator. However, it would also be possible to utilize the brake monitor of this invention as an aftermarket component, wherein a sensor and a magnet is fixed relative to the housing by any suitable means and the shunt is reciprocal with the brake actuator rod without fixing the shunt in a shunt sleeve fixed to the piston rod of the brake actuator.

Having described preferred embodiments of the vehicle brake monitor of this invention, the invention is now claimed, as follows:

1. A vehicle brake monitor, comprising:
    a brake actuator including a housing and a rod reciprocable through an opening in said housing for actuation of a vehicle brake;
    an annular shunt sleeve and surrounding said rod fixed to said rod and reciprocable with said rod having a radially projecting flange portion;
    a ferrous metal shunt located within said radially projecting flange portion of said shunt sleeve extending radially relative to said rod having a length less than said rod;
    a sensor and a magnet fixed relative to said housing on opposed sides of said flange portion of said annular shunt sleeve and said ferrous metal shunt; and
    said shunt interrupting a signal between said sensor and said magnet when said shunt is located between said sensor and said magnet during reciprocal movement of said rod signaling at least one position of said rod relative to said housing.

2. The vehicle brake monitor defined in claim 1, wherein said magnet and sensor are located in a sensor sleeve generally surrounding said rod.

3. The vehicle brake monitor defined in claim 2, wherein said sensor sleeve is an annular stone shield located within said housing opening surrounding said rod.

4. The vehicle brake monitor defined in claim 1, wherein said sensor is a reed switch.

5. The vehicle brake monitor as defined in claim 1, wherein said sensor and magnet are located in an annular sensor sleeve having a central opening surrounding said annular shunt sleeve, said annular sensor sleeve including a radial slot extending from said central opening receiving said radially projecting flange portion of said shunt sleeve and said magnet and sensor located on opposed sides of said radial slot.

6. The vehicle brake monitor as defined in claim 1, wherein said annular shunt sleeve includes two radially projecting circumferentially spaced flange portions, a radially projecting ferrous metal shunt in each of said radially projecting flange portions of said annular shunt sleeve, and said monitor including two pairs of magnets and sensors on opposed sides of each of said radially projecting flange portions and said radially projecting shunts.

7. The vehicle brake monitor as defined in claim 1, wherein said sensor and said magnet are located in a sensor sleeve, said sensor sleeve comprising two interconnected generally semi-circular components fixed to said housing having a central opening receiving said shunt sleeve, wherein each component of said sensor sleeve includes a sensor or a magnet.

8. The vehicle brake monitor as defined in claim 1, wherein said annular shunt sleeve is adjustable longitudinally on said rod and said shunt sleeve is fixed on said rod in its desired position by a lock ring.

9. A vehicle brake monitor, comprising:
   a brake actuator including a housing and a cylindrical rod reciprocable through an opening in said housing for actuation of a vehicle brake;
   a sensor sleeve generally surrounding said rod and fixed relative to said housing having a magnet and a generally opposed sensor located within the magnetic field of said magnet;
   a magnet shunt having a predetermined length less than the length of said rod mounted on said rod to reciprocate with said rod and extending longitudinally along and radially from said rod between said sensor and said magnet; and
   said magnet shunt interrupting a signal between said magnet and said sensor when said magnet shunt is located between said magnet and said sensor during reciprocable movement of said rod, thereby signaling a reciprocal position of said rod.

10. The vehicle brake monitor defined in claim 9, wherein said sensor sleeve includes two pairs of generally opposed spaced magnets and sensors and said rod includes two longitudinally and radially extending shunts each having different predetermined lengths or longitudinal positions along said rod mounted on said rod in circumferentially spaced relation and reciprocal with said rod between each of said pairs of magnets and sensors, said shunts interrupting a signal between each of said pairs of magnets and sensors at different positions of said rod as said rod reciprocates through said housing opening, thereby indicating different positions of said reciprocable rod.

11. The vehicle brake monitor defined in claim 9, wherein said shunt is located on a sleeve fixed to said rod.

12. The vehicle brake monitor defined in claim 9, wherein said sensor is a reed switch.

13. The vehicle brake monitor defined in claim wherein said monitor includes a shunt sleeve surrounding said rod, fixed relative to said rod and reciprocable with said rod through said housing opening, and said magnet shunt fixed to said shunt sleeve and extending longitudinally and radially from said shunt sleeve between said magnet and said sensor through a radial opening in said shunt sleeve.

14. The vehicle brake monitor defined in claim 9, wherein said sensor sleeve is an annular stone shield located within said housing opening surrounding said rod.

15. A vehicle brake monitor, comprising:
   a brake actuator including a housing and a rod reciprocable through an opening in said housing for actuation of a vehicle brake;
   a sensor sleeve mounted on said housing surrounding said rod having a radial opening;
   a magnet and a sensor in said sensor sleeve on opposed sides of said radial opening;
   a shunt sleeve mounted on said rod and fixed to said rod for reciprocal movement with said rod;
   one of said shunt sleeve and said sensor sleeve including a radial keyway and the other of said sensor sleeve and said sensor sleeve including a radial key slideably received in said keyway fixing the relative rotation and said sleeves;
   a magnet shunt mounted on said shunt sleeve having a predetermined length extending radially into said radial opening in said sensor sleeve between said magnet and said sensor as said shunt sleeve reciprocates with said rod through said housing opening; and
   said magnet shunt interrupting a signal between said magnet and said sensor when said shunt is located between said magnet and said sensor during reciprocal movement of said shunt sleeve, thereby signaling a position of said rod relative to said housing.

16. The vehicle brake monitor defined in claim 15, wherein said shunt sleeve is an annular sleeve surrounding said rod and fixed to said rod by a separate connector permitting adjustment of said shunt sleeve on said rod prior to fixing a position of said shunt sleeve on said rod.

17. The vehicle brake monitor defined in claim 15, wherein said sensor sleeve includes two circumferentially spaced radial openings, a sensor and a magnet on opposed sides of each of said radial openings, and said shunt sleeve including two circumferentially spaced magnetic shunts extending radially into said radial openings in said sensor sleeve between said magnets and said sensors on opposed sides of each of said openings having different predetermined lengths or longitudinal positions, wherein said sensors sense different positions of said rod.

18. The vehicle brake monitor defined in claim 15, wherein said sensor sleeve is an annular stone shield mounted within said housing surrounding said shunt sleeve.

19. The vehicle brake monitor defined in claim 15, wherein said shunt sleeve includes a radial projecting portion slideably received in said radial opening in said sensor sleeve and said magnetic shunt is fixed in said radial projecting portion of said shunt sleeve.

20. The vehicle brake monitor defined in claim 15, wherein said sensor is a reed switch.

21. The vehicle brake monitor defined in claim 15, wherein said sensor sleeve includes two circumferentially spaced radial openings and a sensor and a magnet on opposed sides of each of said radial openings and said shunt sleeve including two circumferentially spaced ferrous metal shunts having different predetermined lengths or longitudinal positions along said shunt sleeve, spaced longitudinally on said shunt sleeve and reciprocable with said shunt sleeve between said magnets and said sensors interrupting a signal between said magnets and said sensors at different positions of said rod as said rod reciprocates through said housing opening.

22. A vehicle brake monitor, comprising:
   a brake actuator including a housing and a rod reciprocable through an opening in said housing for actuation of a vehicle brake;
   two pairs of generally opposed spaced magnets and sensors fixed relative to said housing;
   two shunts fixed relative to said rod, each of said shunts reciprocable with said rod between one of said pairs of generally opposed spaced magnets and sensors;
   said shunts interrupting a signal between said pairs of magnets and sensors at different reciprocal positions of said rod as said rod reciprocates through said opening of said housing, said sensors thereby sensing different positions of said reciprocable brake actuator rod relative to said housing.

23. The vehicle brake monitor as defined in claim 22, wherein said monitor includes an annular shunt sleeve surrounding said rod, fixed to said rod and reciprocable with said rod having circumferentially spaced radially projecting flange portions, wherein said radially projecting flange portions of said shunt sleeve each include a ferrous metal shunt extending radially relative to said rod.

24. The vehicle brake monitor as defined in claim 23, wherein each of said pairs of magnets and sensors are located in an annular sensor sleeve having a central opening receiving said shunt sleeve, said sensor sleeve including a plurality of radial slots receiving one of said radially projecting flange portions of said shunt sleeve and one of said pairs of generally opposed magnets and sensors are located on opposed sides of each of said radial slots.

25. The vehicle brake monitor is defined in claim 22, wherein said pairs of generally opposed spaced magnets and sensors are located in a sensor sleeve comprising two interconnected generally semi-circular components fixed to said housing, wherein each of said components includes a magnet and a sensor.

* * * * *